E. LEHR.
POTENTIAL REGULATOR.
APPLICATION FILED MAY 3, 1915.
1,231,628.
Patented July 3, 1917.
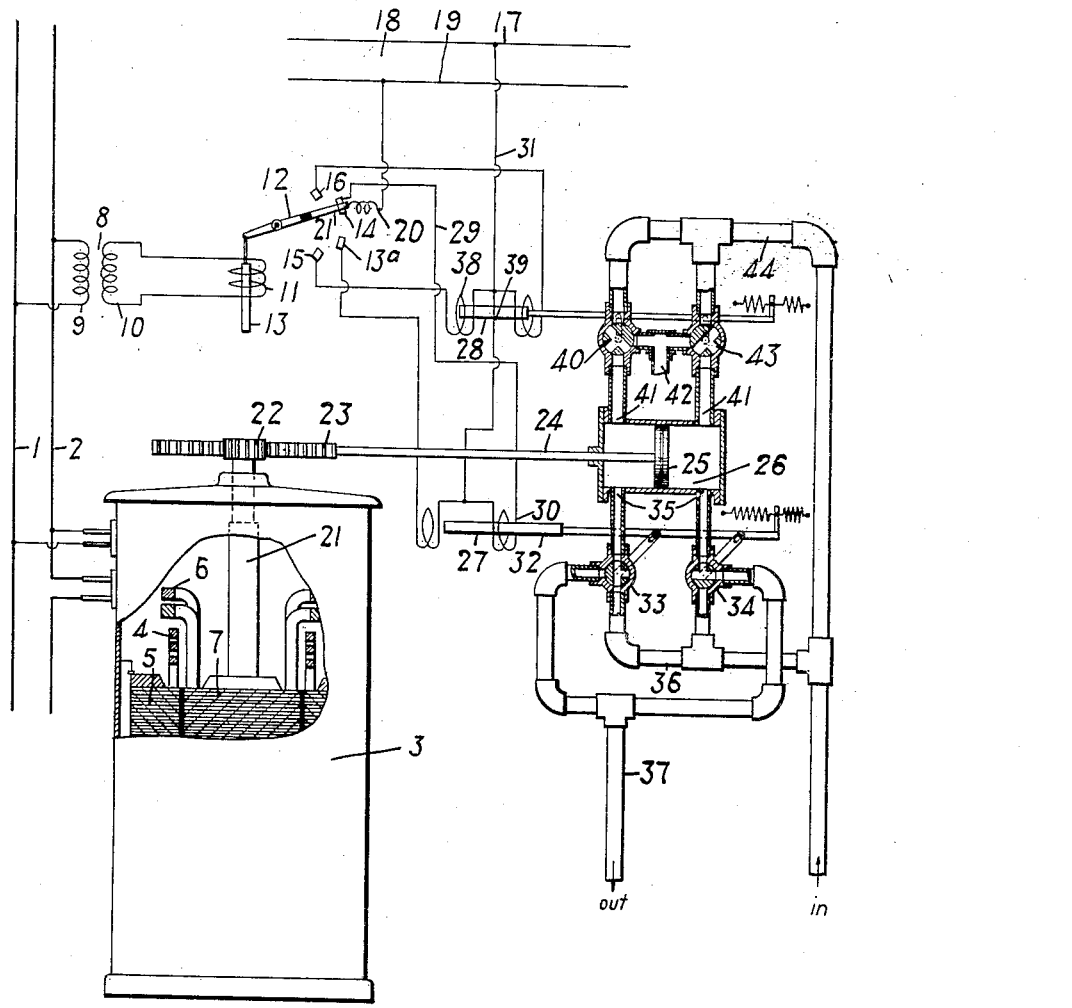
WITNESSES:
INVENTOR
Edwin Lehr.
BY
ATTORNEY

UNITED STATES PATENT OFFICE.

EDWIN LEHR, OF PITTSBURGH, PENNSYLVANIA, ASSIGNOR TO WESTINGHOUSE ELECTRIC AND MANUFACTURING COMPANY, A CORPORATION OF PENNSYLVANIA.

POTENTIAL-REGULATOR.

1,231,628.  Specification of Letters Patent.  Patented July 3, 1917.

Application filed May 3, 1915. Serial No. 25,564.

*To all whom it may concern:*

Be it known that I, EDWIN LEHR, a citizen of the United States, and a resident of Pittsburgh, in the county of Allegheny and State of Pennsylvania, have invented a new and useful Improvement in Potential-Regulators, of which the following is a specification.

My invention relates to systems of regulation for electrical circuits, and it has special reference to control systems for regulators of the induction type whereby constant voltages may be automatically maintained upon electrical circuits.

My invention refers particularly to a system for controlling the speed and the degree of relative movement between the primary and the secondary windings embodied in a regulator of the above-mentioned type, said primary and secondary windings being so disposed with respect to each other that the value of the mutual induction therebetween may be automatically adjusted by my control system.

Potential regulators of the usual type comprise groups of relatively movable coils, some of which are disposed upon a stator and others of which are disposed on a rotor. The position of these coil groups with respect to each other, or, in other words, the position of the rotor with respect to the stator, determines the ratio of the electromotive forces in the coil groups. Heretofore, the rotor has been usually moved by an electric motor which operated at very high speeds. The operation of such motors was controlled by means of meter relays which, under predetermined conditions, completed the motor circuits for rotation in the one or the other direction, as variations in the electromotive force occurred. Because of the inertia of the moving parts of the high-speed motor, the regulator rotor was permitted to run beyond its proper position. For instance, if the motor circuit was closed when only a slight variation from the desired line voltage occurred on the associated electrical circuit, the stator of the regulator would be carried beyond the position which it should occupy in order to restore the voltage to the normal value. As a consequence, the meter relay controlling the motor circuit immediately operated to reverse the direction of rotation of the motor to return the stator of the regulator to its normal position. Under these circumstances, the regulator rotor would fluctuate back and forth relative to the normal position, instead of coming to rest immediately in the normal position.

The object of my invention is to provide a control system for a regulator of the class above indicated which will automatically actuate the rotor thereof to correct variations in the electromotive force of the associated electrical circuit. At the same time, the speed of the rotor will be relatively low when slight variations occur in the circuit and will be relatively high when large variations occur in the circuit. In each case, however, the inertia of the actuating device for the rotor will be substantially small, thereby precluding fluctuations of the rotor about the positions it will occupy at various times to restore the voltage to the normal value.

My invention is illustrated in the accompanying drawing which is a view, partially in section and somewhat diagrammatic, of a transformer regulator and its associated control mechanism which embody a form of my invention.

A main electrical circuit, comprising line conductors 1 and 2, is connected to a source (not shown) of single-phase energy. An induction-type regulator 3 of the usual form, comprising stationary coils 4 disposed on a stator 5 and relatively movable coils 6 disposed upon a rotor 7, is connected in circuit with the line conductors 1 and 2 in order to compensate for the variations in voltage occurring on the main circuit. As above mentioned, the relative positions of the rotor 7 and the stator 5 determine the electromotive-force ratio between the stationary coils 4 and the movable coils 6.

A voltage transformer 8, comprising a primary winding 9 connected in shunt to the conductors 1 and 2 and a secondary winding 10 which supplies current to a relay coil 11, provides means for adjusting the position of a contact member 12 which is pivotally connected to a plunger 13 to be operated by the relay coil 11. The contact member 12 is so adapted that, when normal conditions obtain upon the main electrical circuit, it will occupy a mid-position between conducting sectors 13ª and 14 and other conducting sectors 15 and 16, each of said conducting sectors being connected, through electrical circuits, to one conductor 17 of an auxiliary supply circuit 18. Another conductor 19 of the supply circuit 18, is conducted, through a flexible lead 20, to an insulated portion 21 of the contact member 12.

The rotor 7 of the induction regulator 3 is provided with a centrally-disposed shaft 21, at the upper end of which I have connected a pinion 22 and a rack 23. The rack 23 is connected, through a connecting rod 24, to a piston member 25 of a fluid-pressure cylinder 26. By means of valve magnets 27 and 28, which are selectively actuated in accordance with the position of the aforementioned contact member 12, the relative position and movement of the piston member 25 within the cylinder 26, and, consequently, the relative position and movement of the stator 7 and the rotor 5, may be regulated.

When a slight variation occurs in the voltage of the main electrical circuit, the contact member 12 will engage either the conducting sector 13ª or the conducting sector 14, depending upon whether the variation is negative or positive with respect to the normal voltage obtaining in the main circuit. In the drawing, the contact member 12 is shown as engaging the conducting sector 14, which indicates that a moderate negative variation in the voltage has occurred in the main electrical circuit. In this position, current will flow from the conductor 19 through the flexible conductor 20, the conducting portion 21 of the member 12, the sector 14, a conductor 29, a winding 30 on the valve magnet 27, and a return conductor 31 to the conductor 17. The winding 30 of the valve magnet 27 being energized, a plunger 32 will occupy the position shown in the drawing, and valves 33 and 34, controlling a pair of ports 35 having the same area and being disposed at opposite ends of the cylinder 26, will permit a fluid, under pressure, to be admitted to the fore-end of the cylinder 26. At the same time, fluid will be withdrawn from the rear end of the cylinder 26 through the valve 34. As shown, the valve 33 is connected to an inlet pipe 36 of a fluid-pressure system which may utilize any incompressible fluid. Simultaneously, the valve 34 is so opened as to connect the port 35 at the rear end of the cylinder to an outlet pipe 37 of the fluid pressure system.

Inasmuch as the inertia of the piston member 25 and the rack member 23 is relatively small when slight variations occur in the voltage of the main electrical circuit, the rotor 7 will come to a dead stop at its normal position, and will not overrun, as is the case when an electric motor or other high-inertia device operates the rotor 7. It will be understood that both of the valves 33 and 34 control both inlet and outlet ports of the same area. Under certain conditions, the valve 33 may be opened in such manner that the port 35 at the fore-end of the cylinder constitutes an outlet port, and the valve 34 may be operated in such a manner that the port 35 at the rear end of the cylinder constitutes an inlet port. These latter conditions will obtain when the voltage on the main supply circuit varies slightly above the normal voltage obtaining in the main circuit.

When large variations occur in the voltage of the main electrical circuit, the contact member 12 will engage either conducting sector 15 or conducting sector 16, the particular sector that is engaged being dependent upon whether a positive or a negative variation occurs in the electromotive force. Assuming that a large positive variation in voltage occurs in the main electrical circuit, the conducting sector 15 will be engaged by the contact member 12. In this instance, a coil winding 38 of the valve magnet 28 will advance its plunger 39 in such direction that a valve 40 will be operated to connect a port 41 in the fore-end of the cylinder 26 to an outlet pipe 42 of the fluid-pressure system. Simultaneously, a valve 43 will be so operated that the other port 41 in the rear of the cylinder will be connected to an inlet pipe 44 of the fluid-pressure system. The pair of ports 41, which have the same area and which are larger than the ports 35, are utilized to admit fluid to one end of the cylinder 26 and to withdraw it from the other end when only large variations occur in the voltage. In this manner, the regulator is operated very quickly in order to rapidly restore normal conditions upon the main electrical circuit. The inertia of the moving parts operating the rotor of the regulator 3 is very small, and the rotor will not tend to run beyond its normal position.

From the foregoing description, it will be apparent that, for moderate, or slight, variations in the voltages of the main electrical circuit, the ports 35, having relatively small areas, are brought into action in order to move the rotor 6 to such position as will restore normal voltage on the main electrical circuit. However, when large variations occur upon the main electrical circuit, the ports 41, having relatively large areas, will be brought into play, and the rotor 7 will be rapidly moved to such a position as will restore normal conditions upon the main circuit. By means of disposing the sectors 13, 14, 15 and 16 with respect to the movable contact member 12 of the relay, as shown, that pair of ports which it is desired to bring into play may be selected by reason of the extent of movement of the contact member 12.

While I have shown and described only one embodiment of my invention, it will be understood that many modifications may be made without departing from the spirit and scope of the appended claims.

I claim as my invention:

1. The combination with an electric regulator having a stator and a relatively movable rotor, of a fluid-pressure operating means for actuating the rotor comprising a cylinder and an associated piston, said cylinder having a plurality of ports of different areas for the admission of fluid thereto, and selective means controlled by the amount of variation in the quantity to be regulated by the regulator for opening one of said ports of a given area.

2. The combination with an electric regulator having stationary coils and movable coils, of a fluid-pressure operating means for actuating the movable coils comprising a fluid-pressure cylinder which has a plurality of ports that differ in size for the admission thereto of fluid under pressure, and means controlled by the degree of variation in the quantity to be regulated by the regulator for selecting one of said ports in order to admit fluid to said cylinder.

3. The combination with an electric regulator having a stator and a relatively movable rotor, of a fluid-pressure operating means for actuating the rotor comprising a fluid-pressure cylinder having ports that differ in size, and means for opening certain of said ports when a predetermined degree of correction is required in the quantity regulated and for opening certain other of said ports when a greater degree of correction is required.

4. The combination with an electric regulator having a stator and a relatively movable rotor, of a fluid-pressure operating means for actuating the rotor comprising a fluid-pressure cylinder having a port of small area and a port of large area for the admission thereto of fluid under pressure, of means for automatically opening said port of small area when a predetermined degree of correction is required in the quantity regulated and means for opening said port of large area when a greater degree of correction is required.

5. The combination with an electric regulator having stationary coils and movable coils, of a fluid-pressure operating means for actuating the movable coils comprising a fluid-pressure cylinder which has a plurality of pairs of admission and exhaust ports that differ in size, one port of each size being located at each end of the cylinder, valve magnets which determine the end of the cylinder to which the fluid is to be admitted, and means for automatically opening that pair of ports which is predeterminedly selected by reason of the amount of correction required in the voltage of the associated electrical circuit.

In testimony whereof, I have hereunto subscribed my name this 27th day of April, 1915.

EDWIN LEHR.